US012524470B2

(12) United States Patent
Tow

(10) Patent No.: US 12,524,470 B2
(45) Date of Patent: Jan. 13, 2026

(54) SELECTIVE AGGREGATION OF RECORDS FOR THE APPLICATION OF A FUNCTION

(71) Applicant: Oracle International Corporation, Redwood Shores, CA (US)

(72) Inventor: Daniel S. Tow, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/515,821

(22) Filed: Nov. 21, 2023

(65) Prior Publication Data
US 2025/0165535 A1 May 22, 2025

(51) Int. Cl.
*G06F 16/906* (2019.01)
(52) U.S. Cl.
CPC ................... *G06F 16/906* (2019.01)
(58) Field of Classification Search
CPC ...................................... G06F 16/906
See application file for complete search history.

(56) References Cited

U.S. PATENT DOCUMENTS

| 10,990,645 | B1 * | 4/2021 | Shi | G06N 3/045 |
| 11,216,452 | B2 * | 1/2022 | Chapman | G06F 40/279 |
| 11,636,132 | B1 * | 4/2023 | Karp | G06N 5/02 |
| | | | | 707/722 |
| 11,928,744 | B1 * | 3/2024 | Therrien | G06Q 40/10 |
| 12,164,525 | B2 * | 12/2024 | Spannhake | G06F 16/24556 |
| 2019/0279132 | A1 * | 9/2019 | Escriche | G06N 20/00 |
| 2020/0065303 | A1 * | 2/2020 | Bhattacharjee | G06F 16/278 |
| 2021/0174302 | A1 | 6/2021 | Brahmbhatt et al. | |
| 2022/0058196 | A1 * | 2/2022 | Stoafer | G06F 16/38 |
| 2023/0120206 | A1 * | 4/2023 | Miguel | G06Q 10/063112 |
| | | | | 705/321 |

OTHER PUBLICATIONS

"Application-Defined SQL Functions", Retrieved from https://www.sqlite.org/appfunc.html, Retrieved on Jun. 27, 2023, pp. 1-7.
"Quickstart: Run simple Python scripts with SQL machine learning", Retrieved from https://learn.microsoft.com/en-us/sql/machine-learning/tutorials/quickstart-python-create-script?view=sql-server-ver16, Apr. 3, 2023, pp. 1-7.

(Continued)

*Primary Examiner* — Kris E Mackes
(74) *Attorney, Agent, or Firm* — Invoke

(57) ABSTRACT

Techniques for selectively aggregating records based on a downstream function to be applied to the records are disclosed. A system obtains an instruction corresponding to a set of records and a function to be applied to the set of records. The system determines whether the function meets a particular criteria for aggregating records prior to transmitting the records to an application for executing the function on the records. If the system determines that the function does meet the records-aggregation criteria, the system stores a set of records in a buffer prior to sending the set of records to the function-executing application. The system sends the set of records to the application together as a group with an instruction to generate a set of function results that includes a separate value for each record in the set of records.

23 Claims, 5 Drawing Sheets

(56) References Cited

OTHER PUBLICATIONS

"Running AI queries with SQL Data Insights", Retrieved from https://www.ibm.com/docs/en/db2-for-zos/13?topic=running-ai-queries-sql-data-insights, Feb. 24, 2023, pp. 1-6.
"What is SQL Server Machine Learning Services with Python and R?", Retrieved from https://learn.microsoft.com/en-us/sql/machine-learning/sql-server-machine-learning-services?view=sql-server-ver16, Apr. 3, 2023, pp. 1-4.
Apsaradb, "AnalyticDB for PostgreSQL + LLM: Building The Enterprise-specific Chatbot in the Generative AI Era", Retrieved from https://www.alibabacloud.com/blog/analyticdb-for-postgresql-%2B-llm-building-the-enterprise-specific-chatbot-in-the-generative-ai-era_600111, Jun. 16, 2023, pp. 1-11.
Fard et al., "Vertica-ML: Distributed Machine Learning in Vertica Database", SIGMOD '20: Proceedings of the 2020 ACM SIGMOD International Conference on Management of Data, Jun. 2020, pp. 755-768.
Saeed et al., "Querying Large Language Models with SQL", Apr. 2, 2023, pp. 7.
Sun et al., "SQL-PALM: Improved Large Language Model Adaptation for Text-To-SQL" Jun. 25, 2023, p. 16.
Wendell et al., "Introducing AI Functions: Integrating Large Language Models with Databricks SQL", Retrieved from https://www.databricks.com/blog/2023/04/18/introducing-ai-functions-integrating-large-language-models-databricks-sql.html, Apr. 18, 2023, pp. 1-5.

\* cited by examiner

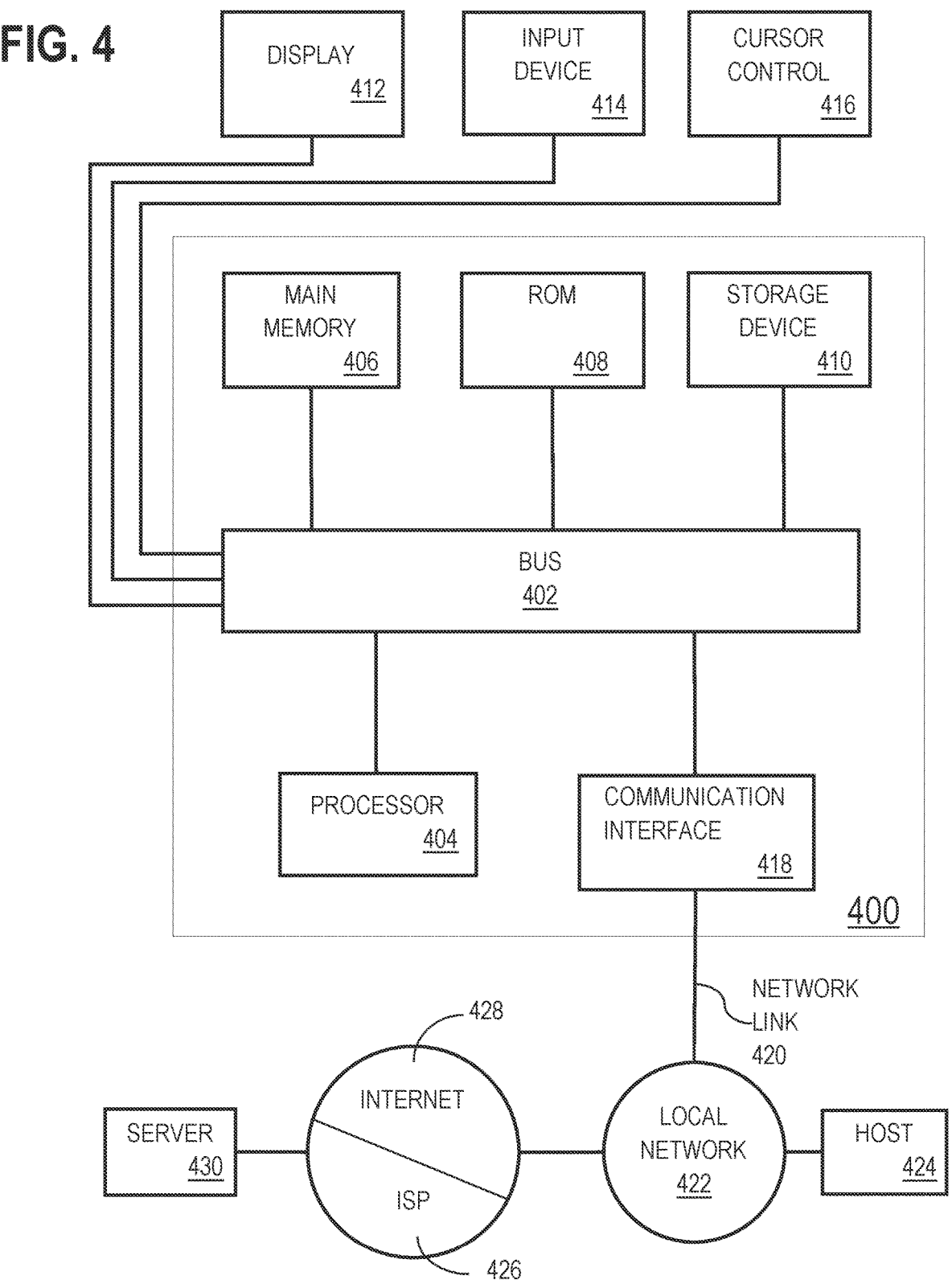

SELECTIVE AGGREGATION OF RECORDS FOR THE APPLICATION OF A FUNCTION

TECHNICAL FIELD

The present disclosure relates to selectively aggregating records for application of a function that may be applied to individual records or to an aggregated set of records.

BACKGROUND

Conventionally, a system may apply a function to each record of a set of records as the records are obtained from a database. In an example, a system may receive a request to apply a translation function to text stored in a set of records in a database. In response to the request, the system executes one or more queries to obtain the set of records. As each record is received, the system invokes a translation function on the received record without necessarily performing any type of aggregation of records for the invocation of the translation function. Accordingly, each record is passed in as an argument for each respective invocation of the translation function.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
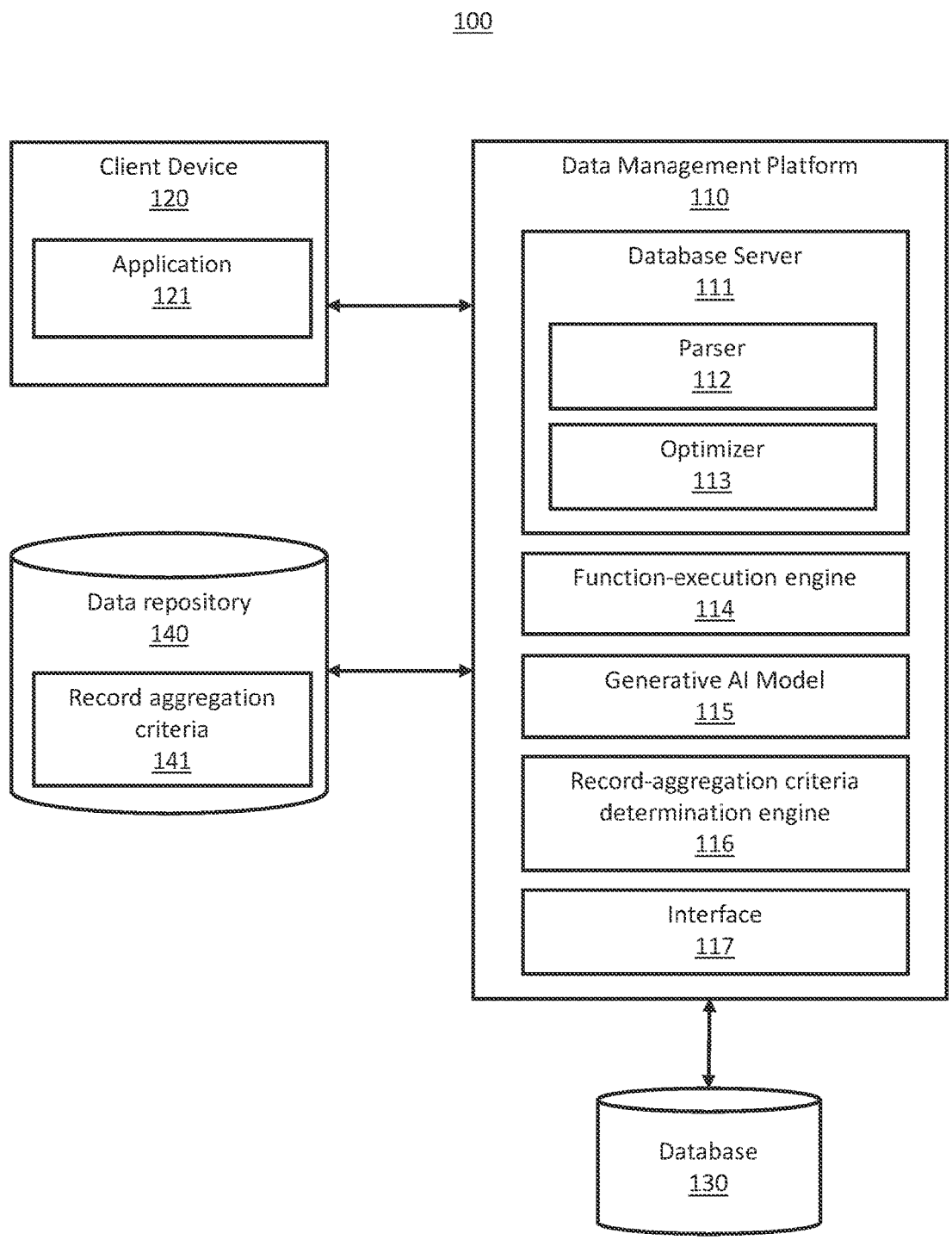
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RECORD AGGREGATION ARCHITECTURE
3. SELECTIVELY AGGREGATING RECORDS BASED ON DOWNSTREAM FUNCTIONS
4. USING TEXT IN MULTIPLE DIFFERENT LANGUAGES TO GENERATE TEXT IN A TARGET LANGUAGE
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments selectively aggregate records for application of a downstream function based on whether the downstream function meets a context-aggregation criterion. In the present specification and claims, a downstream function is a function that is applied to raw data subsequent to retrieving the raw data from a data record, such as a record stored in a database. A downstream function meets a context-aggregation criterion when, for example, application of the function on an aggregated set of records yields better results than application of the function on individual records in isolation. Downstream functions that meet the context-aggregation criteria are referred to in the present specification and claims as "context functions." A downstream function does not meet a context-aggregation criterion when, for example, application of the function on the aggregated set of records does not yield better results than application of the function on individual records in isolation.

When a system determines that a downstream stream function meets the context-aggregation criterion, the system invokes the function on an aggregated set of records rather than invoking the function on each record in isolation. Invoking the function on an aggregated set of records may include, for example, buffering records in a received stream of records until a sufficient number of records have been aggregated within a buffer. In other words, the system refrains from invoking the function on the records that have already been received until the aggregated set of records meets a sufficiency criterion (e.g., a minimum number of records, a minimum amount of data, etc.). Once the aggregated set of records meets the sufficiency criterion, the system invokes the function on the aggregated set of records that have been collected. This mechanism results in a delayed execution for the records being maintained in the buffer. However, a benefit of the delayed execution for the records is better results for application of the function on each of the aggregated set of records.

When the function is invoked on the aggregated set of records, an operation defined by the function is to be performed on a target record in the aggregated set of records. The operation may use the other records in the aggregated set of records to yield better results. The operation may utilize as input, not only the target record, but also information of the other records in the aggregated set of records to deduce additional information regarding the target record. The operation may utilize the other records in the aggregated set of records to determine a context or metadata corresponding to the target record. The context or metadata corresponding to the target record is used to yield better results from the execution of the operation on the target record. The operation may generate a separate result for each record in the aggregated set of records. For example, a system may provide a list of words as a set of input data to a function. The function may perform a particular operation on each word in the list of words to generate a corresponding list of transformed words or values. The function then returns the list of transformed words or values as a result of the invocation of the function on the aggregated set of records.

In an example, applying a language translation function to text within an aggregated set of records may generate a translation that is semantically more accurate than a translation that is generated by applying the language translation function to text within each record, in isolation. In an example, a language translation function yields better results when the language translation function computes a translation for a set of words based on context/nearby words in a data corpus, rather than computing the translation for the set of words in isolation. For example, the word "crane" in a sentence (e.g., "I saw a crane"), may refer to a bird or to construction equipment. A nearby sentence, indicating that the crane is being used constructing a building and providing context, may be used to deduce that the word crane within the sentence is referring to construction equipment. The deduction that the word crane is referring to construction equipment helps to generate a translation in another language that is accurate.

Aggregating a set of records for application of a downstream function may be useful in some scenarios, as described above. However, aggregating the set of records for application of the downstream function instead of applying the downstream function as records become available may be disadvantageous when considering other metrics. For example, applying the downstream function after aggregation of a set of records may consume more resources for execution rather than applying the function to records as they become available. Accordingly, one or more embodiments implement the aggregation techniques described herein, in a selective manner, rather than always or never applying the aggregation techniques. The selective context aggregation applies record aggregation criteria as described here.

One or more embodiments generate text in a target language using a group of text, in multiple source languages, with a same underlying meaning (referred to herein as "equivalent" text). Using equivalent text in multiple source languages to generate text in the target language yields better results than using text in a single source language to generate the text in the target language.

One or more embodiments described in this Specification and/or recited in the claims may not be included in this General Overview section.

2. Record Context Aggregation Architecture

FIG. 1 illustrates a system 100 in accordance with one or more embodiments. As illustrated in FIG. 1, system 100 includes a data management platform 110, a client device 120, a database 130, and a data repository 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The data management platform 110 receives from an application 121 executing on the client device 120 an instruction associated with a set of records stored in the database 130. The data management platform 110 includes a database server 111 to manage queries to the database 130. The database server 111 processes requests by clients, including the application 121, to access the database 130.

The application 121 interacts with the database server 111 by submitting to the database server 111 instructions that cause the database server 111 to perform operations on data stored in the database 130. For example, the application 121 may generate a database statement that conforms to a database language supported by the database server 111. According to one embodiment, the application 121 generates an SQL-type database statement.

The database 130 includes data and metadata stored on one or more memory devices, such as on a set of hard disks. The database 130 stores the data and metadata according to a particular structure. According to one example, the database 130 stores data and metadata as a relational database construct. According to another example, the database 130 stores the data and metadata as an object-oriented database construct. In an embodiment in which the database 130 stores data in an object-oriented structure, one data structure is referred to as an object class, records are referred to as objects, and fields are referred to as attributes. In an embodiment in which the database 130 is a relational-type database, one data structure is referred to as a table, records are referred to as rows of the tables, and fields are referred to as columns. While examples of database structures and languages are provided for purposes of description, embodiments are not limited to any single type of database structure or language.

The database server 111 includes a query parser 112 and a query optimizer 113. The query parser 112 receives a query statement from the application 121 and generates an internal query representation of the query statement. According to an embodiment, the internal query representation represents different components and structures of a query statement. For example, the internal query representation may be represented as a graph of nodes. The internal representation is typically generated in memory for evaluation, manipulation, and transformation by a query optimizer 113.

The query optimizer 113 evaluates the internal query representation to generate a set of candidate execution plans for a executing a query or set of queries. Execution plans specify an order in which execution plan operations are performed and how data flows between each of the execution plan operations. Execution plan operations include, for example, a table scan, an index scan, hash-join, sort-merge join, nested-loop join, and filter.

In one embodiment, the application 121 transmits to the database server 111 a request including a database statement corresponding to (a) a set of records stored in the database 130, and (b) a particular function to be applied to the set of records. The parser 112 parses the database statement to identify the query terms corresponding to the set of records and the particular function. The optimizer 113 generates an execution plan based on the internal query representation generated by the parser 112 that selectively aggregates query results prior to transmitting the query results to a function-execution engine 114 for executing the particular function. The function-execution engine 114 may perform any function to transform a set of input data into a set of output data, such as performing computations using the input data. In one example embodiment, a generative artificial intelligence (AI) machine learning model 115 is a function-execution engine that generates text or image content based on a set of input data.

According to one embodiment, the generative AI model 115 is implemented as a large language model (LLM) machine learning model. Large language models are a type of deep learning model which combines a deep learning technique called attention in combination with a deep learning model type known as transformers to build predictive models. These predictive models encode and predict natural language writing.

LLMs may contain hundreds of billions of parameters trained on multiple terabytes of text. LLMs are trained to receive natural language as an input. LLMs typically generate natural language as an output. In addition, some LLMs may be trained to output computer code, visual output (such as images), and audio output. LLMs are made up of layers of attention mechanisms and neural networks that process input data in parallel. The layers of attention mechanisms and neural networks operating in parallel allow the LLM to learn complex patterns in text.

The attention mechanisms help neural networks to learn the context of words in the sequences of words. An attention mechanism operates by breaking down a set of input data, such as a sentence or sequence of words or tokens, into keys, queries, and values. Keys represent elements of the input data that provide information about what to pay attention to. In the LLM context, queries represent elements of the input data that need to be compared with the keys to determine relevance. Values are elements of the input data that will be selected or weighted based on the attention scores. The attention mechanism calculates a similarity score between each query and key pair. This score reflects how relevant each key is to a given query. Various methods can be used to compute these scores, such as dot-product, scaled dot-product, or other custom functions. The similarity scores are then transformed into attention weights. For example, a system may transform the similarity scores using a softmax function. The softmax function adjusts the values of the similarity scores relative to each other such that the sum of the similarity scores is 1. Finally, the attention weights are used to take a weighted sum of the corresponding values. This weighted sum represents the model's focused or "attended" representation of the input data. In one or more embodiments, the attention mechanisms are implemented using self-attention processes, scaled dot-product attention processes, and multi-head attention processes.

In operation, the LLM receives a natural language prompt as input data and generates a sequence of words in natural language by predicting a next word, or sequence of words, based on the textual and grammatical patterns learned by the LLM during training. In an embodiment in which the generative AI model 115 is implemented as an LLM, the database server 111 generates a function call that includes a set of values from database records as natural-language inputs to the LLM. The database server 111 may further provide, as inputs to the LLM, prompts to specify that the LLM should apply a particular function, such as generating a translation, to each value. In other words, the LLM may receive a set of input data comprising an aggregated set of values (such as words). The function call may specify a function that generates, from the aggregated set of input values, a transformed set of output values that are arranged in the same order as the aggregated set of input values.

In one embodiment, the database statement includes a large language model (LLM)-based SQL group function that passes data to be translated from the database server 111 to an LLM server in groups of pairs. Each pair comprises (a) a set of records comprising text to be translated, in the source language or dialect, and (b) a target language. The SQL group function further passes to the LLM server an instruction to generate a word or phrase, corresponding to a length compatible with the source text, in the target language that best conveys the meaning of the text to be translated in the context of the text in all the other records, among the set of records, passed to the LLM server with the instruction. The LLM server may generate a set of function results and transmit the results back to the database server 111 to provide to the application 121 as an SQL result of the SQL function call.

Based on the type of function associated with a request or instruction, the optimizer 113 determines whether the function meets a set of context-aggregation criteria 141. The context-aggregation criteria 141 may include, for example, a particular set of functions. In addition, or in the alternative, the context-aggregation criteria 141 may include particular performance metrics associated with a function. The specified set of functions that are included among the context-aggregation criteria 141 may include functions which generate a separate function result output for each separate input, among a set of aggregated inputs.

As an example, a database table "Form_Prompts" may store prompts for forms presented by an application in a digital user interface. The prompts for a particular form may include "Name," "date of birth," "employee ID," "organization," and "grade." The function may be a translation-type function to direct a generative AI machine learning model 115 to translate the values stored in the "Form_Prompts" database table into another language. The results of the function may include a separate result for each prompt. If the table includes six prompts for a particular form to be translated, the function generates six corresponding translations. However, the function may use one or more of the additional five prompts as context for translating a current prompt. For example, the generative AI model 115 may be instructed to translate the prompt "grade" from English to Spanish. The generative AI model 115 may generate the translation by using the prompts "Name," "date of birth," and "organization" as context. The generative AI model 115 may determine from the context that the translation for the word "grade" should be a noun associated with an individual's ranking or classification.

The data management platform 110 includes a context-aggregation criteria determination engine 116. The context-aggregation criteria determination engine 116 may analyze the performance associated with functions applied to query results to determine which attributes to include among the context-aggregation criteria 141. For example, the context-aggregation criteria determination engine 116 may determine to include a particular function among a set of functions included in the context-aggregation criteria 141 based on determining the particular function has improved performance when provided with contextual information. Contextual information may include, for example, additional query terms corresponding to additional queries. In addition, or in the alternative, contextual information may include additional query results. In addition, or in the alternative, contextual information may include additional function-execution results associated with additional query results. The context-aggregation criteria determination engine 116 may determine that a particular function that may generate a set of output values based on a corresponding set of input values will be more accurate, will be more efficient, will consume fewer resources, or will complete more rapidly when the set of query results is grouped together prior to transmitting the query results to a function-execution engine 114.

According to one embodiment, the context-aggregation criteria 141 includes a performance metric associated with the function. For example, the generative AI model 115 may perform a content-generation function more efficiently when provided with a set of query results (which may be input prompts for the generative AI model 115) as a group rather than individually. According to yet another example, the function may be a sequence of computations or operations performed on the set of query results. The system may determine that data transmission times or function-execution times are improved when the function inputs, or query results, are provided to a function-execution engine 114 as a group, rather than individually.

If the optimizer 113 determines that a function associated with a database statement does not meet context-aggregation criteria, the optimizer 113 generates an execution plan that invokes the downstream function subsequent to obtaining a current query result and prior to obtaining a next query result. If the optimizer 113 determines that a function associated with a database statement does meet context-aggregation criteria, the optimizer 113 generates an execution plan that buffers a set of query results prior to invoking the downstream function.

For example, a query may correspond to a set of 100 query results. The optimizer 113 may generate an execution plan that buffers the 100 query results before transmitting the 100 query results to the generative AI model 115 to perform the specified function 100 times on the respective 100 query results. In addition, or in the alternative, the optimizer 113 may generate an execution plan that buffers a predefined or threshold number of query results before transmitting the query results to the generative AI model 115. For example, if a query corresponds to a set of 100 query results, the execution plan may specify that the database server 111 will buffer 10 query results, to generate and transmit 10 separate sets of 10 separate query results to the generative AI model 115.

In an embodiment in which the application 121 provides to the database server 111 a database statement including a group-type function that meets the context-aggregation criteria 141, the database server 111 receives a set of function results from the function-execution engine 114 or generative AI model 115 and returns the set of function results as a response to the database statement.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or may execute on the same computing system as the data management platform 110. Alternatively, or additionally, a data repository 140 may be implemented or executed on a computing system separate from the data management platform 110. A data repository 140 may be communicatively coupled to the data management platform 110 via a direct connection or via a network.

Information describing context-aggregation criteria 141 may be implemented across any of components within the system 100. However, this information is illustrated within the data repository 104 for purposes of clarity and explanation.

In one or more embodiments, data management platform 110 refers to hardware and/or software configured to perform operations described herein for managing operations and functions associated with data stored in a database 130. Examples of operations for selectively grouping records based on downstream functions to be applied to the records are described below with reference to FIG. 2.

In an embodiment, the data management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 117 refers to hardware and/or software configured to facilitate communications between a user and the database server 111. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

Additional embodiments and/or examples relating to computer networks are described below in Section 6, titled "Computer Networks and Cloud Networks."

3. Selectively Aggregating Records Based on Downstream Functions

Figure 2:
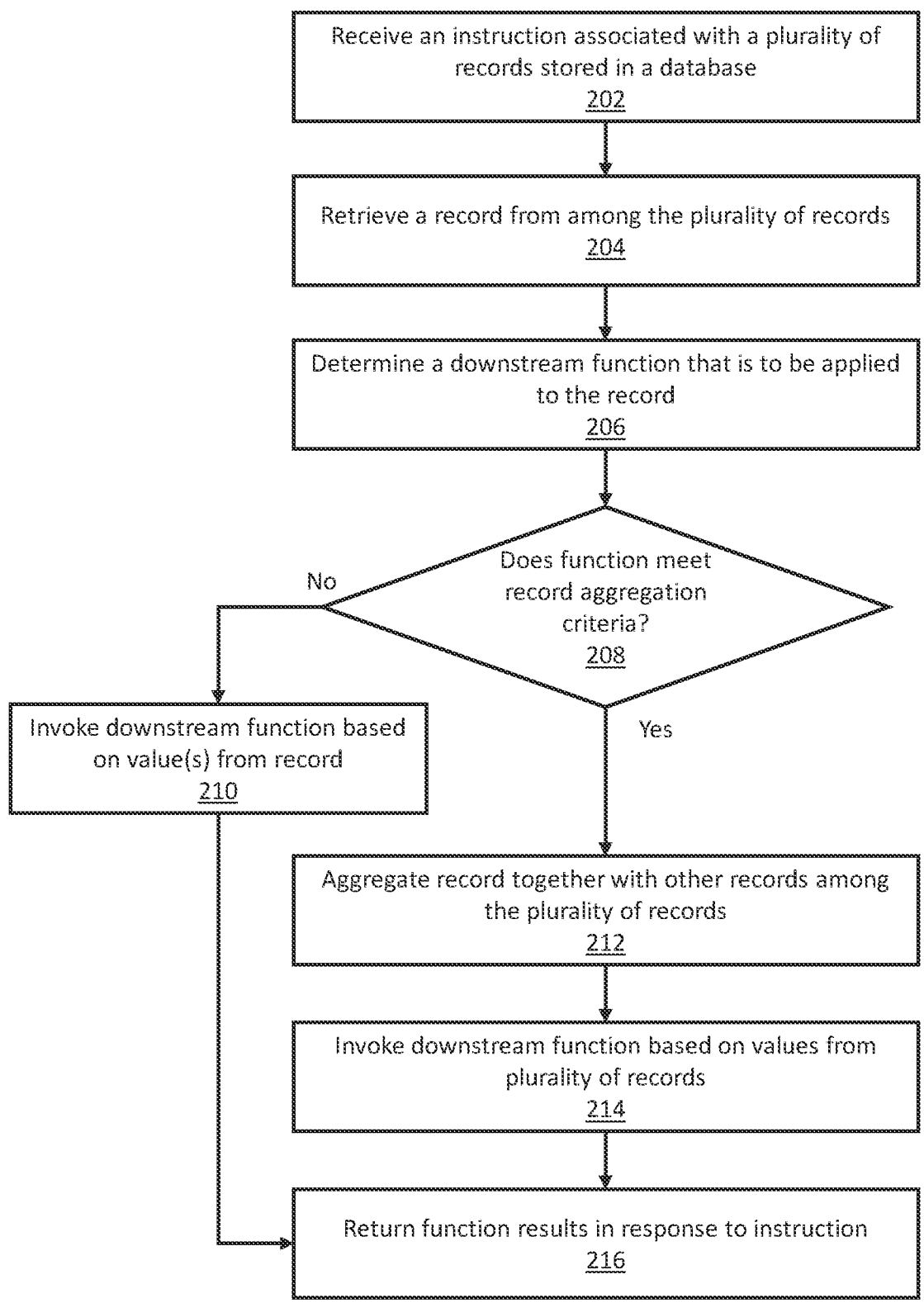
FIG. 2 illustrates an example set of operations for selectively aggregating records based on a downstream function in accordance with one or more embodiments.

FIG. 2 illustrates an example set of operations for selectively aggregating records based on a function to be applied to the records in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives an instruction to execute a function on a target set of records stored in a database (Operation 202). The instruction may include identifiers that explicitly identify each record in the target set of records. Alternatively, or additionally, the instruction may include one or more attributes of the records within the target set of records. The attributes may be used to execute a query and retrieve the target set of records from a database.

In an example, the instruction may specify a particular data table or set of data tables stored in a database. In addition, or in the alternative, the instruction may specify a particular data object or set of data objects stored in a database. In addition, or in the alternative, the instruction may specify one or more values associated with fields of records stored in the database.

As noted above, the instruction identifies a function to be performed on a set of data specified in the instruction. In one embodiment, the function is to be performed by a generative artificial intelligence (AI) machine learning model, and the set of data is a set of records stored in a database. For example, the function may be a "translate" function implemented using a generative AI model. The set of records may correspond to values stored in fields of one or more data objects, one or more tables, or a subset of records in the data objects or tables. Another function may be to have a generative AI model generate a phrase or sentence using a query result. For example, if a set of query results includes 100 terms, the function may prompt a generative AI model to generate 100 phrases or 100 sentences based on the respective 100 terms.

In one embodiment, an operation defined by the function is to be performed on a target record in the aggregated set of records. The operation may use the other records in the aggregated set of records to yield better results. The operation may utilize as input, not only the target record, but also information of the other records in the aggregated set of records to deduce additional information regarding the target record. The operation may utilize the other records in the aggregated set of records to determine a context or metadata corresponding to the target record. The context or metadata corresponding to the target record is used to yield better results from the execution of the operation on the target record. The operation may generate a separate result for each record in the aggregated set of records. For example, a system may provide a list of words as a set of input data to a function. The function may perform a particular operation on each word in the list of words to generate a corresponding list of transformed words or values. The function then returns the list of transformed words or values as a result of the invocation of the function on the aggregated set of records. For example, if the function is to translate values from a set of fields in a database table, a generative AI model generates a separate translation for each value.

As an example, a database table "Form_Prompts" may store prompts for forms presented by an application in a digital user interface. The prompts for a particular form may include "Name," "date of birth," "employee ID," "organization," and "grade." The function may be a translation-type function to direct a generative AI machine learning model to translate the values stored in the "Form_Prompts" database table into another language.

As another example, a database table "Patients" may store phrases corresponding to observed symptoms of patients or an anonymized representation of patients. Example values stored in the database table "Patients," for a particular patient, may include, for example "sore throat," "fever," "rash on wrist," and "sores on forearm." The function may be a natural-language-type function directing a generative AI type machine learning model to generate a natural-language sentence for each respective symptom from the database table.

In one embodiment, the target records and the function are included in a combined instruction to a database server. The database server parses the instruction to identify the function to be performed and the attributes for a set of records to be retrieved from the database. The database server communicates with a server storing a generative AI model to perform the function specified in the combined instruction. For example, the combined instruction may include a large language model (LLM)-based SQL function that passes data to be translated from a database server to an LLM server in groups of pairs. Each pair comprises (a) set of text tokens to be translated, in the source language or dialect, and (b) a target language. The SQL function further passes to the LLM server an instruction to generate a word or phrase, corresponding to a length compatible with the source text, in the target language that best conveys the meaning of the text to be translated in the context of the text in all the other text tokens, in the set of text tokens, passed to the LLM server with the instruction. The LLM server may generate a set of function results and transmit the results back to the database server to provide as an SQL result of the SQL function call. According to an embodiment, the function returns single-row results and uses the group of single-row results for context to aid in creating better single-row results.

Based on the received instruction, the system retrieves a record (Operation 204). For example, the record may correspond to a row of a database table. In addition, or in the alternative, the record may correspond to an object in a database. The system may be receiving a stream of records including the target group of records. The record, as referenced in Operation 204, may be one record, from the target group of records, that is being received in the stream of records.

The system determines at least one downstream function that is to be applied to the record (Operation 206). The at least one downstream function may be, for example, a set of multiple functions. In an example in which query terms and functions are parts of a combined instruction to a database server, the database server parses the instruction to identify the downstream functions to be applied to the record. Alternatively, the downstream functions may be represented as metadata transmitted together with the instruction to the database server. According to yet another example, a data management platform includes functionality to interface with a database server or system and with a generative AI server or system. The data management platform receives an instruction including query terms and functions.

The system determines whether the function meets context aggregation criteria (Operation 208). In the example in which the function is a set of multiple functions, the system may determine whether any of the multiple functions meets the context aggregation criteria. According to one embodiment, the system divides the set of functions to be applied to the record into a first set of functions that do not meet context-aggregation criteria and a second set of functions that do meet context-aggregation criteria. For example, the system may determine whether a given function is among a specified set of functions that are known to meet a context-aggregation criteria. The specified set of functions may include function defined by operations which (a) are applied to query results separately, and (b) have improved performance when provided with contextual information. Contextual information may include additional query results (e.g., records and values stored in tables). In addition, or in the alternative, contextual information may include additional function-execution results associated with additional query results. According to one embodiment, the contextual information includes text from other records that are from a same data corpus. The other records may provide context because they relate to the same topic as the initial record. The aggregated set of records may include text that is derived from a same data corpus, or text that is associated with a same topic or category tag.

In one or more embodiments, the system determines whether function operations have improved results when provided with contextual information based on user feedback, based on system-monitored metrics, or based on machine learning. The system can, for example, get feedback from a user regarding results generated by the function. If the feedback is negative for results that were generated by invoking the function on individual records in isolation and positive when the results were generated by invoking the function on an aggregated set of records, the system identifies the function operations would have improved performance when provided with contextual information. If there is no difference in feedback associated with results that were generated by invoking the function on individual records in isolation and the results generated by invoking the function on an aggregated set of records, the system determines that the function operations would not have improved performance when provided with contextual information.

One or more embodiments apply a machine learning model to determine whether to apply context-aggregation for the function. Each training dataset for training the machine learning model may include characteristics of a particular function and a label indicating whether or not aggregation is to be applied. The trained machine learning model can be applied to a feature vector representing the downstream function to determine whether apply the function to individual records in isolation or whether to apply the function to an aggregated set of records.

According to one example, a request or instruction may correspond to a downstream function to translate a set of words from fields of a database table. One of the words may be "grade." In English, the word "grade" can either be a noun or a verb and may be related to either a slope or a level of achievement or ranking. The system may determine that a translation function is more likely to generate a correct translation for the word "grade" when provided with context, including additional query results. For example, previously-received user feedback may have indicated that a translation-type function yielded improved translation accuracy when provided with related terms, such as terms located in a same data object or table as a term being translated. As another example, a machine learning model may learn via a process of iterative training on datasets that translation-type functions should be provided with aggregated sets of inputs (e.g., database records). Accordingly, the translation function may be included among a list of functions for which query results are aggregated prior to initiating the function.

Based on determining that a particular function, among the set of functions to be applied to the set of records, does not meet the context-aggregation criteria, the system invokes the downstream functions based on the value, or values, of the record (Operation 210). In the example in which the function to be applied to a set of records includes multiple functions, the system may invoke the downstream functions based on determining that none of the multiple functions meets the context-aggregation criteria. The system does not include in the function-invoking operation values from other records that may yet be retrieved, or that may be in the process of being retrieved, based on the request or instruction. For example, the request or instruction may match a database table containing 10 records. The system may execute queries to the database table to retrieve the 10 records one-by-one. Upon retrieving the first record, and based on determining that the downstream functions do not meet the context-aggregation criteria, the system invokes the functions using the first record as an argument to generate, by execution of each function, a first function result. Subsequent to invoking the functions, the system then retrieves the second record. The system invokes the functions using the second record as an argument to generate function results for that row. The system repeats the process on the third through hundredth records associated with the instruction.

According to one example in which the function is performed by a generative AI machine learning model, the system transmits a first record to the generative AI model, which performs the specified function to generate a first function result. The system then transmits a second record to the generative AI model, which performs the specified function to generate a second function result. The process repeats until the generative AI model has executed the function one hundred times to generate 100 results.

For example, an instruction may include a function capitalize/de-capitalize one or more characters in a set of records. The system may determine based on user feedback that aggregating a set of query results prior to applying the function to capitalize words or de-capitalize words has no effect on performance of the function compared to applying the function to each record in isolation. In other words, characteristics of additional records in a set of query results have no effect on the capitalization of a target record in the set of query results. As another example, a function may re-order characters of words stored in a table. The system may determine based on user feedback, or based on a machine learning prediction, that a character-reordering function is not a type of function for which query results should be aggregated prior to invoking the function. User feedback may indicate that aggregating words in a table prior to invoking the function yields no performance benefit compared to invoking the function on each word in isolation. According to yet another example, a function may count a number of words in a document. The system may determine based on user feedback, or based on a machine learning model, that a function that counts characters, words, or tokens in records is not a type of function for which query results should be aggregated prior to invoking the function. User feedback may indicate that aggregating records, or documents, prior to invoking the function yields no performance benefit compared to invoking the function on each record in isolation.

Based on determining that the function does meet the context-aggregation criteria, the system aggregates the set of records or values corresponding to the query (Operation 212). In the example in which the function to be applied to the records includes multiple functions, the system may aggregate the set of records based on determining at least one of the multiple functions meets the context-aggregation criteria. For example, a request or instruction may match a database table containing 100 records. The system may query the database table to retrieve the records one-by-one. Based on determining that a downstream function does meet the context-aggregation criteria, the system buffers the 100 separate records into a single group or set of records. Alternatively, the system may buffer the 100 separate records into multiple groups, such as ten groups of ten records each. As one example, the system aggregates the records in a result comprising 10 rows, each row corresponding to a summary of 10 rows.

In one embodiment, the determination whether to buffer a set of query results prior to invoking a downstream function is performed by a query optimizer of a database server. The query optimizer generates an execution plan for (a) executing a sequence of queries to a database to obtain a set of records, and (b) buffering, or refraining from buffering, the set of records resulting from the sequence of queries prior to transmitting the records to a function-execution engine.

In one embodiment, the system aggregates a set of records until a sufficient number of records have been aggregated within a buffer. In other words, the system refrains from invoking the function on the records that have already been received until the aggregated set of records meets a sufficiency criterion (e.g., until either (a) a minimum number of records, a minimum amount of data, etc. is retrieved, or (b) all the records associated with a particular query have been retrieved). Once the aggregated set of records meets the sufficiency criterion, the system invokes the function on the aggregated set of records that have been collected.

Subsequent to buffering the target set of records corresponding to the instruction, the system invokes the downstream function (Operation 214). In one embodiment, a database server retrieves a set of records associated with a request or instruction. The database server transmits the set of records together with a function prompt to a generative AI model to prompt the generative AI model to perform a particular function on each of the target set of records. In one embodiment, the downstream function receives as arguments (a) a particular record for which a function result is to be generated, and (b) a target set of additional records for which the generative AI model is to extract contextual information to generate the function result for the particular record.

For example, if the function is a generative AI machine learning model, the system transmits the set of 10 records to the generative AI model, which performs the specified function on each respective record to generate a response including 10 separate result values corresponding to the original 10 inputs. The generative AI model may return a response comprising 10 separate values corresponding to the 10 separate records. According to one example, the system passes to the generative AI model a table storing a set of input values. The generative AI model executes a specified function on the set of input values to generate a result set including a set of output values of the same number, and in the same order, as the set of input values. According to another example, the system passes to the generative AI model a list comprising a set of input values. The generative AI model executes a specified function on the set of input values to generate a list including a set of output values of the same number, and in the same order, as the set of input values.

Referring to an example in which query results correspond to prompts in a database table "Form_Prompts," and in which a function corresponds to a translation function to translate each prompt into another language, the system provides the stored prompt "grade" as a function argument to be translated and the terms "Employee_data", "organization," "name", and "date of birth" as additional argument to provide contextual data to the generative AI model to generate the translation for the term "grade." The generative AI model may determine from the additional prompts that the context for the term "grade" is more likely related to an individual's rank than a slope. Accordingly, the generative AI model generates a translation of the term "grade" that corresponds to a ranking.

In one embodiment, the system generates a function call including a notation to identify each record as a separate function argument. For example, if the function is a translation-type function to be performed by a generative AI machine learning model, the generative AI model may be capable of generating a translation for either (a) each query result separately, or (b) all of the query results together. The function call includes the notation to identify each record as a separate function argument to cause the generative AI model to generate a separate translation for each separate query result. The function call may also include parameters for the function, such as a maximum length of a function result (e.g., translating a single word into no more than two words) and a format of a set of function results (such as a table or list).

The system returns the function results in response to the instruction (Operation 216). For example, an application may provide a database statement to a database server. The database statement may include query terms and a particular function. The database server executes a set of queries to obtain query results, aggregates the query results, provides the aggregated query results as an input data set to a generative AI model, receives the function results, as an output data set, from the generative AI model, and provides the function results to the application in response to the database statement.

4. Using Text in Multiple Different Languages to Generate Text in a Target Language One or more embodiments generate text in a target language using a group of text, in multiple source languages, with a same underlying meaning (referred to herein as "equivalent" text). Using equivalent text in multiple source languages to generate text in the target language yields better results than using text in a single source language to generate the text in the target language. The system may build a dictionary of terms or phrases in a target language by applying the methods herein to each group of text, with the same underlying meaning, to generate the text in the target language with that same underlying meaning.

According to one or more embodiments, a relational database stores translation tables that map a table storing language-independent data to tables storing language-specific data. For example, one table may store product IDs for a set of products. The product ID's may be language-independent sets of numbers and letters. Other tables storing product descriptions in different languages may be mapped to the product ID table.

Currently, if an enterprise wants to add a new language to a list of languages supported by an application, a translator must manually translate thousands of short words and phrases that, out of context, are often ambiguous in meaning. Given the ambiguity of meaning in many of the short words and phrases to be translated, the translator must not only understand the source and target languages chosen for the translation, but also the detailed application context in which those terms apply. According to one or more embodiments, a system provides a set of data to be translated to a generative AI model, such as an LLM model, with translations of the same data in other languages provided to the LLM as contextual information.

According to one embodiment, the system implements an SQL group function that passes data to be translated from the database server to an LLM server in groups of pairs of (text-to-be-translated, Language-or-dialect-to-translate-from), together with a named Target language, with LLM instruction and training that it is to find the compatibly-long word or phrase in the target language that best conveys the best shared meaning behind all the text-language pairs passed in that group. For example, the system may provide to the LLM three pairs: (a) word-1, (b) language 1; (c) word-2, (d) language 2; and (e) word-3, (f) language 3. The system may further provide a target language: language 4. The LLM determines the best underlying meaning fitting the three words in the 3 languages and translates that meaning expressed in languages 1, 2, and 3 into target language 4 and passes the translated text back to the database server to insert into the SQL result as the output of that SQL function call.

According to one embodiment, a function call passed to the LLM may pass a single target language name once per set of grouped rows, while passing the whole set of text/source language pairs pertaining to the group of texts to be translated to the single target-language result. The database server packages these groups and sends each group as an individual request to the LLM. The database server then receives each result and inserts that result into the SQL result as the output of the SQL group function.

In one example, applications written for global use rely on "translations tables" in a relational database. These translations tables may have a two-part primary key. The two-part primary key may include an Entity_ID and a Language_Code, and one or more text columns that include attributes corresponding to the entity denoted by Entity_ID, in the language or dialect corresponding to by Language_Code. These tables may join to a base entities table that holds language-independent data about the same entity. For example, the system may have a base Products table, with primary key Product_ID, which may join to a table Products_TL, with primary key (Product_ID, Language_Code), where Products_TL may additionally have text columns Product_Name and Product_Description that may generally be different for each of a set of application-supported languages or dialects (dialects, for example, including American English and British English).

Given the ambiguity of meaning in many terms to be translated, a translation function needs a knowledge base that includes (a) the source and target languages chosen for the translation, and (b) the detailed application context in which those terms apply.

One or more embodiments implement or use a Large Language Model (LLM) that understands a set of the source languages that may be applied to generate accurate translations. While the underlying meaning of the terms to be translated might be ambiguous in any given source language, the combination of text for a given entity across all existing source languages is likely to match a shared underlying meaning. The system translates the shared underlying meaning to the target language.

In an example, the English text "prompt" is ambiguous, roughly meaning either "cue" or "quick,." However, if a translations table stored "prompt" for its English translation, and stored "rápido" for its Spanish translation applying to the same entity ID, then the LLM may deduce the intended underlying meaning of "prompt" as "quick." If the target language was German, the LLM may generate "schnell" as the translation of "quick," the best shared underlying meaning of both "prompt" and "rápido."

One or more embodiments create or use an LLM-driven SQL group function that passes data to be translated from the database server to an LLM server in groups of pairs of (text-to-be-translated, Language-or-dialect-to-translate-from), together with a named Target language, with LLM instruction and training that it is to find the compatibly-long word or phrase in the target language that best conveys the best shared meaning behind all the text-language pairs passed in that group. Having determined the needed text in the specified target language, the LLM then passes that translated text back to the database to insert into the SQL result as the output of that SQL function call.

For example, a group function GROUP_TRANSLATE may have three arguments, <SourceText>, <SourceLanguage>, <TargetLanguage> in that order. A Supported_Languages table may have the columns (Language_Code, Language_Name). In order to add Ukrainian to the set of languages covered for Products_TL (mentioned above), using a new Language_Code='UKR', the system may generate the following instruction set:

```
INSERT INTO Products_TL (Product_ID,
Language_Code, Product_Name, Product_Description)
```

```
SELECT t.Product_ID, 'UKR',
GROUP_TRANSLATE(t.Product_Name,
sl.Language_Name, 'Ukrainian'),
GROUP_TRANSLATE(t.Product_Description,
sl.Language_Name, 'Ukrainian')
FROM Products_TL t,
JOIN Supported_Languages sl ON
t.Language_Code = sl.Language_Code
GROUP BY t.Product_ID;
```

The result may be, at a minimum, an inexpensive yet high-quality first draft of the required new translations for the new target language. The above template may be easily repeated across dozens of different translations tables tied to different base tables.

The communication between database server and LLM server may be encrypted in both directions for security. The user SQL function GROUP_TRANSLATE may call a behind-the-scenes database function that adds arguments and explicitly handles the interface to the LLM. For example, this function may locally calculate the average and maximum text length in the group and assign a fresh discussion_id for each new query, and a new Request_id for each requested translation, while finding the address of the default LLM to be used by GROUP_TRANSLATE. Each GROUP_TRANSLATE call for each grouped row then (200 calls, for the example statement, for 2 function calls for each of 100 Product_IDs, for example) may then become 200 internal-function calls that added a database-session return address, a database server return address, an LLM Server address, a Conversation_ID, and a Request_ID to the data already spelled out in GROUP_TRANSLATE, all to be used to handle a series of packetized messages from the database to the LLM and back.

The LLM process may execute on the database server, as a built-in part of the database, or used as a shared resource between many distinct database servers having network links, directly or indirectly, to a smaller number of LLM servers.

Translation for a globalized application faces a trade-off between long translation results that most precisely convey the desired meaning, and shorter translations that concisely convey the meaning in context sufficiently well and that fit better on a user report or screen. The translation might aim for a target length, with a "soft" maximum and a "hard" maximum. GROUP_TRANSLATE may find its target length as the average of the text lengths being translated for that individual group, across all languages. The soft maximum, which the LLM would try not to exceed unless the result would be poor, may be the maximum length of all the stored text lengths in the group, across all languages. The default hard maximum may be the maximum-allowed length of the text argument passed to the GROUP_TRANSLATE function. For example, if Product_Name was a VARCHAR2 (120) column in the Products_TL table, then the database would use 120 as its hard-maximum, found in the data dictionary when the SQL parses, and would pass that hard-maximum to the LLM along with the other three explicit arguments. Users may also have access to the optional fourth argument hard-maximum to override this default with an explicit maximum. The <AverageTextLength> and <MaximumTextLength> can be found by the database as it groups texts to be group-translated and can be passed to the LLM as guiding targets along with the <HardMaximum> determined at SQL parse time.

In the example, the function call passed to the LLM may pass the single target language name once per set of grouped rows, while passing the whole set of (<text>,<SourceLanguageName>) pairs pertaining to the group of texts to be translated to the single target-language result. The database may package these groups and send each group as an individual request to the LLM, then receive each result and insert that result into the SQL result as the output of the SQL function. The LLM may be free to apply higher weight to less-ambiguous source-language text, as well as to source language text for source languages that the LLM is better trained to translate, when translating a set of (text, language) pairs for the group-translation task.

In an example, the GROUP_TRANSLATE task is performed by a plain-vanilla chatbot LLM that accepts ordinary text prompts, and the prompt sent from the database to the chatbot LLM may include "Translate the following set of (text, language) pairs that are meant to convey the same underlying meaning into the single best choice of translation result in <TargetLanguageName>, targeting a translation-result length of <AverageTextLength>, trying hard not to exceed <SoftMaximum> length, and definitely not exceeding <HardMaximum> length: <set of (text, language) pairs>."

In another example, the system trains the LLM to understand this basic and repeated task as a named, recurring request that it is specifically trained to handle well, so that the LLM may recognize and optimally handle the concise specialized prompt "GTRANSLATE (TargetLanguage>, <TargetLength>, <SoftMaxLength>, <HardMaxLength>, ((<text1>, <Language1>), (<text2>, <Language2>), . . . , (<textN>, <LaguageN>))" as being equivalent to (or better than) the above wordy prompt to a general-purpose chatbot not trained specifically for this task.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
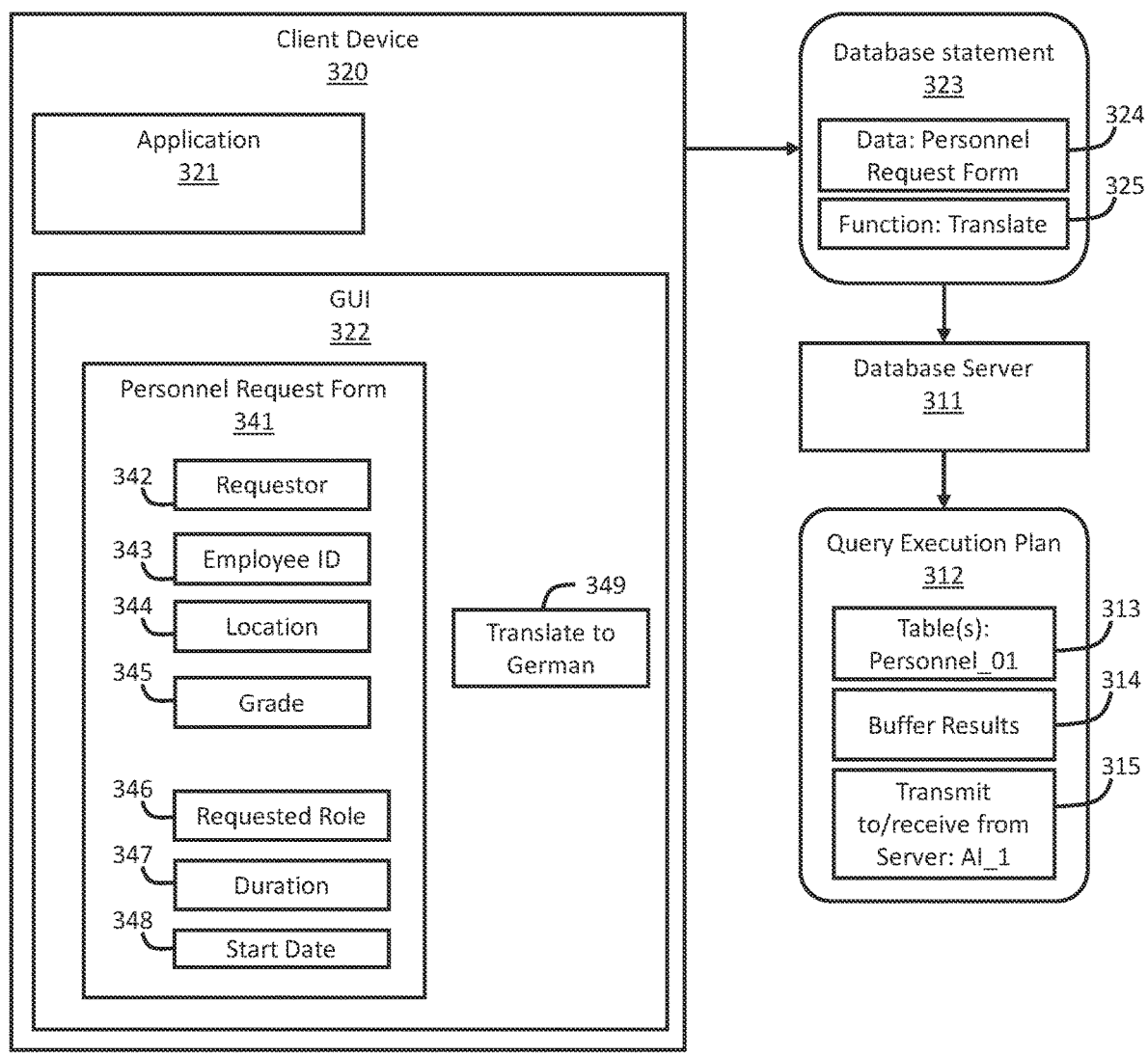
FIGS. 3A and 3B illustrate an example embodiment.
Figure 3B:
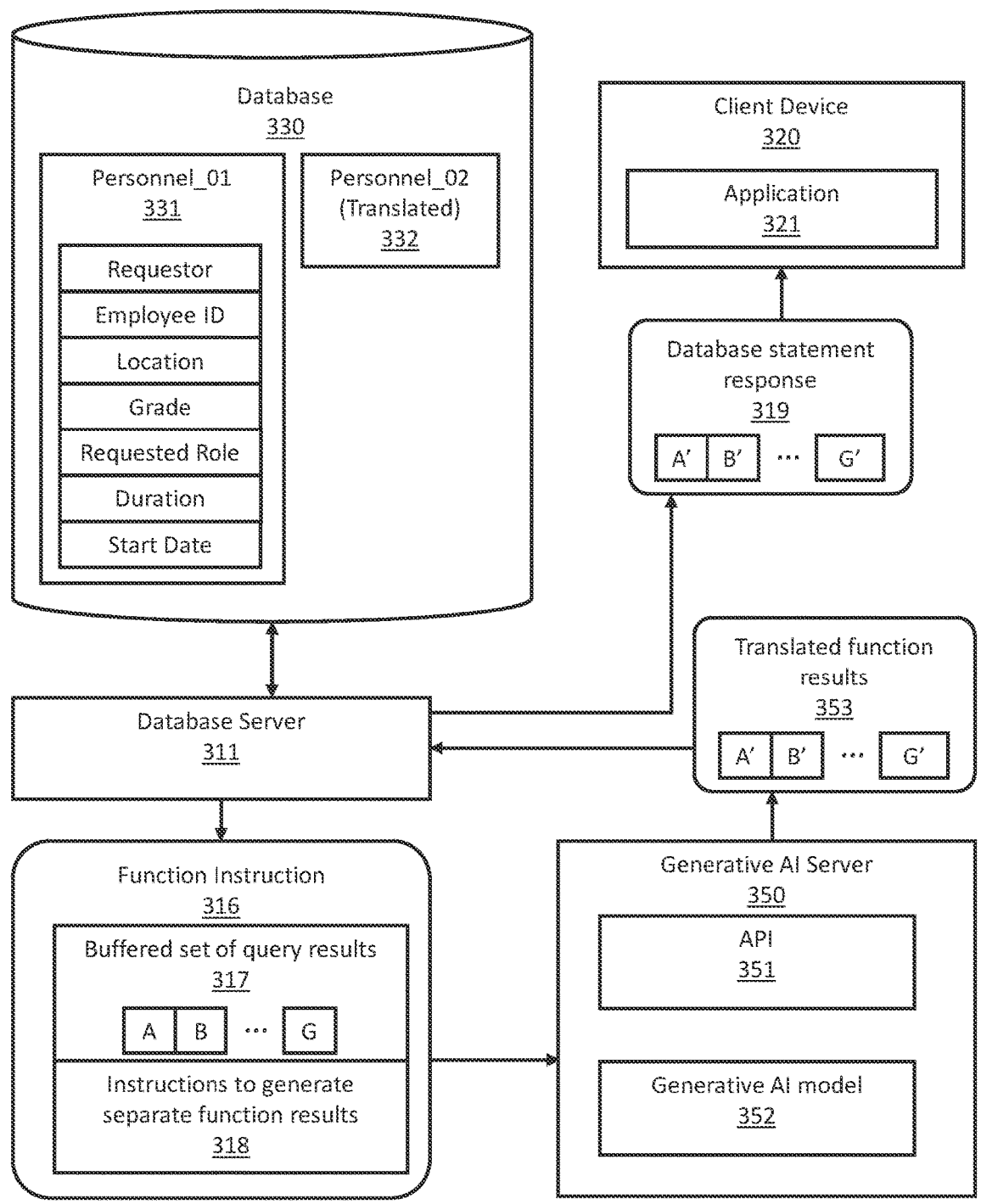

Referring to FIG. 3A, a client device 320 includes a display device for presenting a graphical user interface (GUI) 322. The GUI 322 displays data retrieved from a database. In the example illustrated in FIG. 3A, the GUI 322 displays a personnel request form 341. The form 341 includes fields for a requestor (field 342), an employee ID (field 343), a location (field 344), a grade (field 345), a requested role (field 346), a duration (field 347), and a start date (field 348). An enterprise stores forms in a database 330, as illustrated in FIG. 3B. In particular the enterprise stores the form prompts (i.e., "requestor," "employee ID," "location," etc.) in the database 330. An application 321 executing on the client device 320 obtains the prompts from the database 330 via a database server 311 and presents the prompts as a digital form 341 in the GUI 322. When a user enters values for the respective prompts, the system may store the resulting form as a separate table or object in the database 330, or as values in a set of fields (such as a column of a table) in an existing table stored in the database 330. The application 321 includes a field 349 to initiate functions associated with the form 341. For example, a user may initiate a function to translate the form 341 to another language. In the example illustrated in FIG. 3A, a user generates an instruction to translate the prompts of the form 341 from English to German.

Based on the user-generated instruction, the application 321 generates a database statement 323. The database statement specifies a data set 324 and a function 325 to be applied to the data set. In the example illustrated in FIG. 3A, the data set includes the prompts for the personnel request form. The function is a translate function.

Referring to FIGS. 3A and 3B, the translate function 325 specified in the database statement 323 is an SQL function that passes data to be translated from a database server 311 to a generative AI server 350 as a group including (a) a set of tokens to be translated, and (b) a target language into which to translate the set of tokens (such as words or sets of words). The SQL function further passes to the generative AI server 350 an instruction to generate a word or phrase, corresponding to a length compatible with the source text, in the target language that best conveys the meaning of the text to be translated in the context of the text in all the other tokens, in the set of tokens, passed to the generative AI server 350 with the instruction.

Based on the received database statement 323, the database server 311 generates a query execution plan 312. The query execution plan 312 identifies, for example, a location 313 of data to be obtained by queries to the database 330 (i.e., table Personnel_01). The query execution plan 312 further indicates that the query results should be buffered (314). The query execution plan 312 further identifies the generative AI server (315) to which the query results should be transmitted.

The database server 311 determines that the query results should be buffered (314) prior to transmitting the query results to the generative AI server by analyzing the function (i.e., translate) to determine if the function meets a set of context-aggregation criteria. In particular, the database server 311 determines that the translate function is included in a list of functions for which separate query results are be buffered prior to being transmitted to an external application that will execute a function on the query results.

The database server 311 obtains a set of query results from the database 330. In particular, the database server 311 executes a set of operations to identify seven rows stored in the table 331 Form_Prompts associated with the Personnel Request Form: Requestor, Employee ID, Location, Grade, Requested Role, Duration, and Start Date. The database server generates a function instruction 316 to invoke the translation function. The function instruction 316 includes the buffered set of query results 317, represented as blocks A, B, . . . . G, in FIG. 3B. The function instruction 316 further includes instructions to generate a separate interpretation for each separate query result: Requestor, Employee ID, Location, Grade, Requested Role, Duration, and Start Date. The instructions 318 may further specify that the Generative AI server 350 should return function responses in the same order as the query results 317 are stored in the function instruction 316. The instructions 318 may further include instructions that limit a length of function results. For example, the length-limiting instructions may specify that a translation for a single word should be one word. Alternatively, the length-limiting instructions may specify that the translation results should be no more than one word longer than the word or words being translated.

The function instruction 316 corresponds to at least one application programming interface (API) function specified by the API 351 to invoke a translation function of the generative AI model 352. For example, the API 351 may specify particular parameters and formatting required to invoke the translation function of the generative AI model 352. The API 351 may specify that a group of text input to the model may not exceed a specified size. The API 351 may specify particular languages that the generative AI model 352 is trained to generate translations for.

Based on the function instruction 316, the generative AI model 352 generates a set of translated function results 353. In particular, the generative AI model 352 generates a translation for each query result using the remaining query results for context. In particular, as illustrated in FIG. 3B, the buffered set of query results 317 is provided as a list of seven different terms (i.e., Requestor, Employee ID, etc.) in a particular order (depicted as A, B, . . . . G, for purposes of illustration). The generative AI model 352 generates as function results a list of seven different translated terms, depicted in FIG. 3B as A', B' . . . . G', in the same order as the terms appeared in the buffered set of query results 317. When providing a translation for the term Requestor, the generative AI model 352 uses the additional terms (i.e., Employee ID, Location, Grade, etc.) as context for the translation. For example, the term "grade" has different meanings in English, including a ranking and a slope. The generative AI model 352 uses the terms Requestor, Employee ID, Location, etc. as context for translating the term Grade. As a result, the generative AI model 352 translates the term Grade as corresponding to a ranking and not a slope.

The database server 311 obtains the translated function results 353 from the generative AI server 350. In one embodiment, the system receives a request at run-time to translate a set of form prompts. For example, a system may display form prompts in a form via a graphical user interface (GUI) and, while displaying the form, receive a request to translate the form prompts to another language. The database server 311 may initiate a series of queries and functions to fulfill the request. The system may fulfill the request without generating any persistent data object of the translated form prompts. For example, each time a user requested a translation, the database server 311 may initiate a new set of queries and functions. In an alternative embodiment, the database server 311 generates a new table 332 "Personnel 02" to store the translated prompts. The application 321 may access the table 332 to generate a digital representation of the personnel request form 341 in which the prompts are in German. The database server 311 provides the translated function results 353 to the application 321 executing on the client device 320 in response to the database statement 323. The database statement response 319 may also include address information for the table 332 to allow the application 321 to access the table 332 generated as a result of the translation function.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
   accessing a first record;
   determining a first downstream function that is to be applied to the first record;
   determining whether the first downstream function meets one or more context aggregation criteria;
   responsive to determining that the first downstream function does not meet the one or more context aggregation criteria:
      selecting the first record as a first argument for invoking the first downstream function, and
      initiating a first process for resolving the first downstream function using the first argument;
   accessing a second record;
   determining a second downstream function that is to be applied to the second record and one or more additional records;
   determining whether the second downstream function meets the one or more context aggregation criteria;
   responsive to determining that the second downstream function meets the one or more context aggregation criteria:
      aggregating the second record and the one or more additional records to generate a set of records,
      selecting the set of records as a second argument for resolving the second downstream function, and
      initiating a second process for resolving the second downstream function using the second argument.

2. The one or more non-transitory computer readable media of claim 1, wherein the operations further comprise:
   identifying a plurality of downstream functions to be applied to the set of records; and
   determining whether any of the plurality of downstream functions meets the one or more context aggregation criteria,
   wherein the second record and the one or more additional records are aggregated based on determining at least one of the plurality of downstream functions meets the one or more context aggregation criteria.

3. The one or more non-transitory computer readable media of claim 1, wherein the first process is initiated subsequent to obtaining the first record and prior to obtaining any additional records to which the first downstream function is also to be applied.

4. The one or more non-transitory computer readable media of claim 1, wherein initiating the second process comprises transmitting the set of records together for application of the second downstream function.

5. The one or more non-transitory computer readable media of claim 1, wherein the operations further comprise:
   receiving a first output of the first downstream function resulting from application of the first downstream function to the first record; and
   receiving a second output of the second downstream function resulting from application of the second downstream function to the set of records.

6. The one or more non-transitory computer readable media of claim 5, wherein the second output comprises a table comprising a set of function results corresponding to the set of records arranged in at least one of a row and a column.

7. The one or more non-transitory computer readable media of claim 1, wherein the second argument includes the set of records in a first order;
   wherein the operations further comprise:
      receiving an output of the second downstream function resulting from application of the second downstream function to the set of records,
   wherein the output of the second downstream function comprises a set of components corresponding respectively to the set of records, the set of components being in a second order, and
   wherein a component is in a same position, within the second order of the set of components, as a corresponding record within the first order of the set of records.

8. The one or more non-transitory computer readable media of claim 1, wherein the operations further comprise obtaining the one or more additional records by querying a database for records on which the second downstream function is to be applied.

9. The one or more non-transitory computer readable media of claim 1, wherein the second record and the one or more additional records are aggregated in a buffer prior to initiating the second process.

10. The one or more non-transitory computer readable media of claim 1, wherein the one or more context aggregation criteria represent an improvement in performance of the second downstream function achieved by aggregating the second record and the one or more additional records in comparison with applying the second downstream function to the second record without aggregating the second record and the one or more additional records.

11. The one or more non-transitory computer readable media of claim 1, wherein determining that the second downstream function meets the one or more context aggregation criteria comprises:
   determining a request for the second record to be used in the second downstream function includes the second record and omits the one or more additional records; and
   determining that aggregating the second record and the one or more additional records to select as the second argument for resolving the second downstream function improves the performance of the second downstream function.

12. The system of claim 11, wherein the operations further comprise:
   identifying a plurality of downstream functions to be applied to the set of records; and
   determining whether any of the plurality of downstream functions meets the one or more context aggregation criteria,
   wherein the second record and the one or more additional records are aggregated based on determining at least one of the plurality of downstream functions meets the one or more context aggregation criteria.

13. A method, comprising:
   accessing a first record;
   determining a first downstream function that is to be applied to the first record;
   determining whether the first downstream function meets one or more context aggregation criteria;
   responsive to determining that the first downstream function does not meet the one or more context aggregation criteria:
      selecting the first record as a first argument for invoking the first downstream function, and
      initiating a first process for resolving the first downstream function using the first argument;
   accessing a second record;
   determining a second downstream function that is to be applied to the second record and one or more additional records;
   determining whether the second downstream function meets the one or more context aggregation criteria;
   responsive to determining that the second downstream function meets the one or more context aggregation criteria:
      aggregating the second record and the one or more additional records to generate a set of records,
      selecting the set of records as a second argument for resolving the second downstream function, and
      initiating a second process for resolving the second downstream function using the second argument.

14. The one or more non-transitory computer readable media of claim 1,
   wherein determining that the second downstream function meets the one or more context aggregation criteria comprises:
   determining that a request for the second record to be used in the second downstream function includes the second record and omits the one or more additional records; and determining that aggregating the second record and the one or more additional records to select as the second argument for resolving the second downstream function improves the performance of the second downstream function.

15. The one or more non-transitory computer readable media of claim 1,
   wherein determining whether the second downstream function meets the one or more context aggregation criteria includes determining if the second downstream function is a language translation function,
   wherein the second record includes a first word to be translated by the language translation function,
   wherein aggregating the second record and the one or more additional records to generate a set of records includes aggregating the first word and one or more additional words in one or more documents, and
   wherein initiating the second process for resolving the second downstream function using the second argument includes initiating a language translation process to translate the first word using the one or more additional words as context for translating the first word.

16. The method of claim 13, wherein initiating the second process comprises transmitting the set of records together for application of the second downstream function.

17. The method of claim 16, further comprising:
   identifying a plurality of downstream functions to be applied to the set of records; and
   determining whether any of the plurality of downstream functions meets the one or more context aggregation criteria,
   wherein the second record and the one or more additional records are aggregated based on determining at least one of the plurality of downstream functions meets the one or more context aggregation criteria.

18. The method of claim 17, wherein the second output comprises a table comprising a set of function results corresponding to the set of records arranged in at least one of a row and a column.

19. The method of claim 13, wherein the second argument includes the set of records in a first order,
   wherein the method further comprises:
      receiving an output of the second downstream function resulting from application of the second downstream function to the set of records,
   wherein the output of the second downstream function comprises a set of components corresponding respectively to the set of records, the set of components being in a second order, and
   wherein a component is in a same position, within the second order of the set of components, as a corresponding record within the first order of the set of records.

20. The method of claim 13, further comprising: obtaining the one or more additional records by querying a database for records on which the second downstream function is to be applied.

21. The method of claim 13, wherein the second record and the one or more additional records are aggregated in a buffer prior to initiating the second process.

22. A system comprising:
   one or more processors; and
   memory storing instructions that, when executed by the one or more processors, cause the system to perform operations comprising:
   accessing a first record;
   determining a first downstream function that is to be applied to the first record;
   determining whether the first downstream function meets one or more context aggregation criteria;
   responsive to determining that the first downstream function does not meet the one or more context aggregation criteria:
      selecting the first record as a first argument for invoking the first downstream function, and
      initiating a first process for resolving the first downstream function using the first argument;
   accessing a second record;
   determining a second downstream function that is to be applied to the second record and one or more additional records;
   determining whether the second downstream function meets the one or more context aggregation criteria;

responsive to determining that the second downstream function meets the one or more context aggregation criteria:
aggregating the second record and the one or more additional records to generate a set of records,
selecting the set of records as a second argument for resolving the second downstream function, and
initiating a second process for resolving the second downstream function using the second argument.

23. The system of claim 22, wherein the operations further comprise:
identifying a plurality of downstream functions to be applied to the set of records; and
determining whether any of the plurality of downstream functions meets the one or more context aggregation criteria,
wherein the second record and the one or more additional records are aggregated based on determining at least one of the plurality of downstream functions meets the one or more context aggregation criteria.

* * * * *